United States Patent [19]

Capetanopoulos

[11] 4,124,508
[45] Nov. 7, 1978

[54] GAS TRANSFER SYSTEM

[75] Inventor: Constantine Capetanopoulos, Dobbs Ferry, N.Y.

[73] Assignee: Ecolotrol, Inc., Bethpage, N.Y.

[21] Appl. No.: 843,237

[22] Filed: Oct. 18, 1977

[51] Int. Cl.$^2$ ............................ C02B 5/04; B01F 3/04
[52] U.S. Cl. .................................. 210/194; 210/218; 210/220; 210/322; 261/83
[58] Field of Search .................. 55/342, 400, 401; 210/14, 15, 60, 63 R, 63 Z, 194, 195 R, 198 R, 218, 220, 221 R, 322; 261/29, 36 R, 83, 121 R

[56] References Cited

U.S. PATENT DOCUMENTS

| | | | |
|---|---|---|---|
| 2,355,564 | 8/1944 | Sebald | 210/60 X |
| 3,094,479 | 6/1963 | Sweeney | 261/83 X |
| 3,497,066 | 2/1970 | Nicol | 210/220 X |
| 3,524,547 | 8/1970 | Nicol | 210/220 X |
| 3,540,589 | 11/1970 | Boris | 261/83 X |
| 3,772,187 | 11/1973 | Othmer | 210/60 X |
| 3,779,913 | 12/1973 | Martin | 210/63 R |
| 3,856,671 | 12/1974 | Lee et al. | 210/194 X |
| 3,926,588 | 12/1975 | Speece | 210/63 R X |

Primary Examiner—Charles N. Hart
Assistant Examiner—Robert H. Spitzer
Attorney, Agent, or Firm—Michael Ebert

[57] ABSTRACT

A gas transfer system adapted to dissolve a gas or other compressible fluid in a relatively non-compressible liquid such as waste water with a minimum expenditure of energy. The system makes use of a drum divided by radial vanes into liquid chambers. Rotation of the vanes causes the chambers to rotate about the central axis of the drum whereby in the course of every operating cycle, each chamber is brought into operative relation with the respective interfaces of an inflow station, a gas transfer station and an outflow station. At the inflow station, raw liquid to be treated is fed into the chamber then in operative relationship therewith to produce a liquid batch therein. Concurrently, at the transfer station another batch of raw liquid in the chamber then in operative relation therewith is subjected to pressurized gas to effect the absorption of the gas by the liquid. At the outflow station, the treated batch of liquid in the chamber then in operative relation therewith is discharged to empty this chamber so that it can be refilled with raw liquid and the cycle repeated.

17 Claims, 6 Drawing Figures

GAS TRANSFER SYSTEM

BACKGROUND OF INVENTION

This invention relates generally to a gas transfer system in which a gas or other compressible fluid is dissolved in water or other relatively-incompressible fluent material to be treated, and more particularly to a system in which the fluent material to be treated is subjected to pressure to enhance the absorption of gas with a minimal expenditure of energy.

Though there are many industrial processes which call for the transfer of a gas to a fluent material, by way of example we shall consider a process in which the fluent material is waste water or sewage and the gas is oxygen. In waste water treatment, dissolved oxygen is the factor that determines whether biological changes are brought about by aerobic or anaerobic organisms. The former requires free oxygen and produces innocuous end products, whereas the latter can utilize chemically-bonded oxygen and the end products are generally obnoxious. Hence a vital unit operation in waste treatment involves the transfer of oxygen to the liquid for the creation and maintenance of aerobic conditions.

The productivity of a gas transfer system in which oxygen is dissolved in water waste is determined by the gas transfer rate. This productivity may be significantly raised by pressurizing the liquid, thereby enhancing absorption of the oxygen by increasing the gas saturation value of the liquid. Normally such pressurization entails the expenditure of a considerable amount of energy in order to maintain a flow of liquid waste through the gas transfer reactor under high pressure conditions. The energy required to pump the liquid is quite high because of the back pressure needed to dissolve the oxygen.

With rising energy costs, conventional pressurized gas transfer systems are becoming much more expensive to operate. This factor, in a period of restricted municipal budgets, may in some instances discourage the acquisition of a modern sewage treatment system by a municipality despite the pressing need for pollution control.

The patent to Speece, U.S. Pat. No. 3,926,588, discloses a gas transfer system which achieves a high level of pressurization to enhance the absorption of oxygen or other gas by fluent material without, however, entailing the high expenditure of energy normally required to effect such pressurization. In the Speece system, the liquid to be treated is alternately supplied to two plug flow chambers against a relatively low back pressure sufficient to displace gas-treated liquid therefrom. Gas is dissolved in the liquid in each flow chamber while it is sealed from the influent source, such sealing being effected by the closing of valves during each operating cycle of the system.

When a given flow chamber is sealed from the influent source, it is connected into a closed flow loop which includes a gas transfer apparatus. A circulatory pump induces recirculating flow in the flow loop, while a pressurizing pump maintains the liquid being recirculated through the gas transfer apparatus under continuous pressure. Valves are provided to isolate the pressurized loop from the liquid inflow and outflow of the system, the various valves being operated in a predetermined sequence in the course of an operating cycle.

The Speece system is both elaborate and sizable, for it involves two distinct plug flow chambers, several valves, programmed controls for operating the valves in proper sequence as well as a complicated network of pipes to intercouple the valves with the chambers, the pumps and the gas transfer device.

Hence while the gas transfer arrangement disclosed in the Speece patent makes it possible to minimize the energy requirements for such systems, the advantages gained thereby are offset to a significant degree by the large space requirements of this arrangement, its complexity and its relatively high construction, installation and maintenance costs.

SUMMARY OF INVENTION

In view of the foregoing, it is the main object of this invention to provide a simple, inexpensive system adapted to transfer a compressive gas or other compressible fluid to a relatively non-compressible liquid or other fluent material requiring treatment, with a minimal expenditure of energy.

More particularly, an object of this invention is to provide an efficient and reliable gas transfer system in which the liquid to be treated is fed into a drum divided by radial vanes into distinct liquid chambers which operate in conjunction with inflow, gas transfer and outflow stations to effect pressurized treatment of the liquid, thereby enhancing the absorption of the gas. No valves, sequential valve controls therefor or elaborate piping are required in conjunction with the drum.

A significant advantage of a system in accordance with the invention is that it requires a relatively short detention time for the liquid batch being treated, and this makes it possible to use a small drum. Accordingly, the overall system is highly compact, uncomplicated and trouble-free, so that the system may be constructed, operated and maintained at low cost.

Briefly stated, these objects are attained in a gas transfer system in accordance with the invention wherein a cylindrical drum is divided by radial vanes into distinct liquid chambers, and wherein rotation of the vanes causes these chambers to rotate with respect to the interface ports of an inflow station, a gas transfer station and an outflow station. The arrangement is such that the interface ports are in communication with the chambers in the course of each operating cycle except when the vanes register with and block the ports.

At the inflow station, raw liquid to be treated is fed into the chamber when in operative relation with its interface port to produce a liquid batch wherein before this chamber is advanced into operative relation with the interface port of the gas transfer station where the liquid batch is subjected to pressurized gas to effect the absorption of the gas by the liquid. When the chamber containing the treated liquid is thereafter brought into operative relation with the interface port of the outflow station, the treated liquid is discharged to empty the chamber so that it can be refilled with raw liquid and the operating cycle repeated.

The arrangement is such that as one batch of raw liquid is being produced in one chamber, another batch of previously-produced raw liquid is being concurrently treated with pressurized gas in another chamber, so that while the system is based on a batch pressure, it has the advantages of a continuous process. And despite the fact that the system involves a batch operation, it requires no valves or valve controls, for the operating transitions take place at the cross-overs between the station interfaces and the rotating vanes defining the liquid chambers.

OUTLINE OF DRAWINGS

For a better understanding of the invention as well as other objects and further features thereof, reference is made to the following detailed description to be read in conjunction with the accompanying drawings, wherein:

FIG. 6 is a schematic diagram of a two-chamber drum included in a fifth embodiment of the invention.

DESCRIPTION OF INVENTION

First Embodiment

Figure 1:
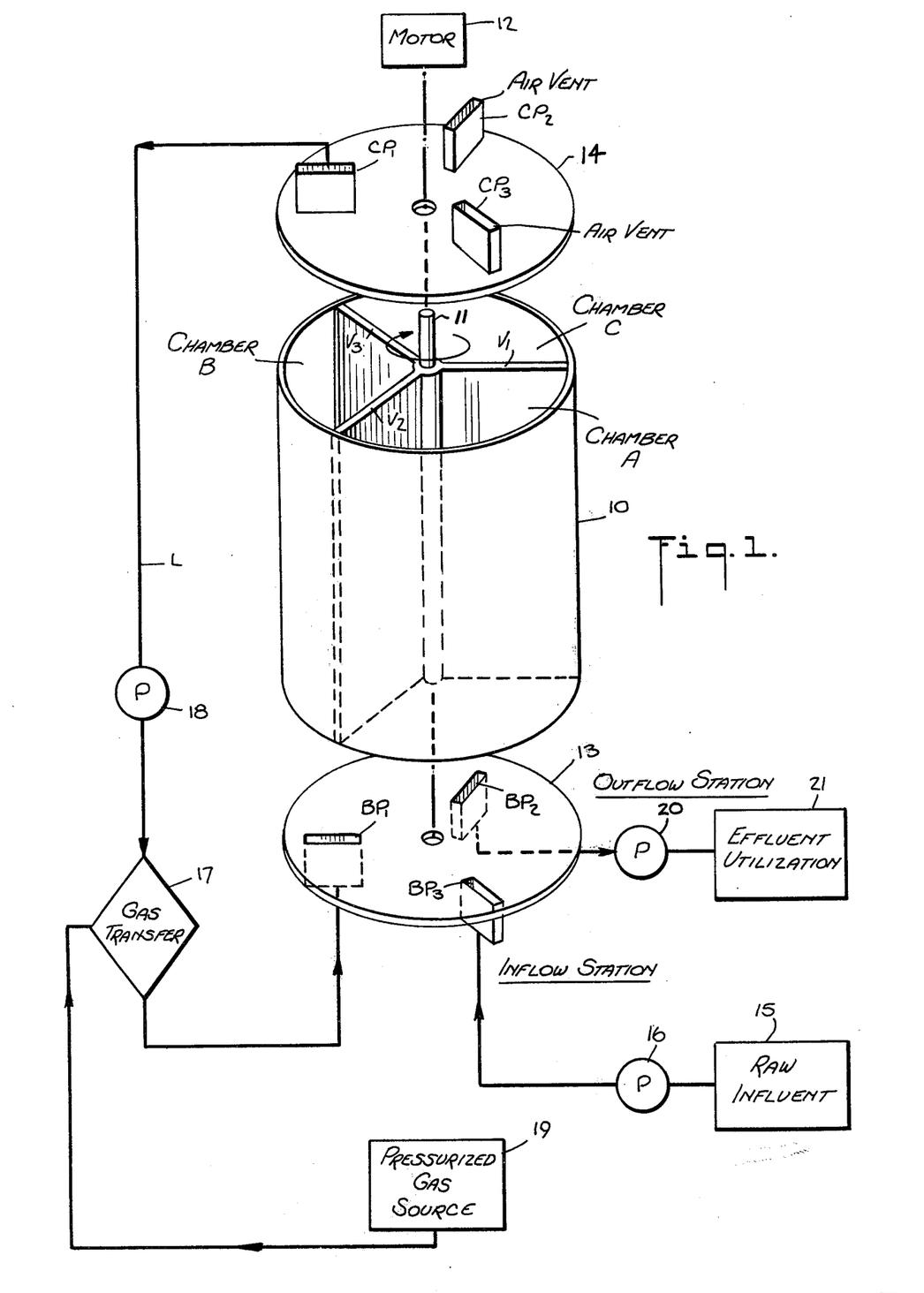
FIG. 1 is an exploded view of a three-chamber drum included in a first preferred embodiment of a high-intensity transfer system adapted to transfer gas to a liquid or other fluent material with a minimum expenditure of energy.
Figures 2, 3:
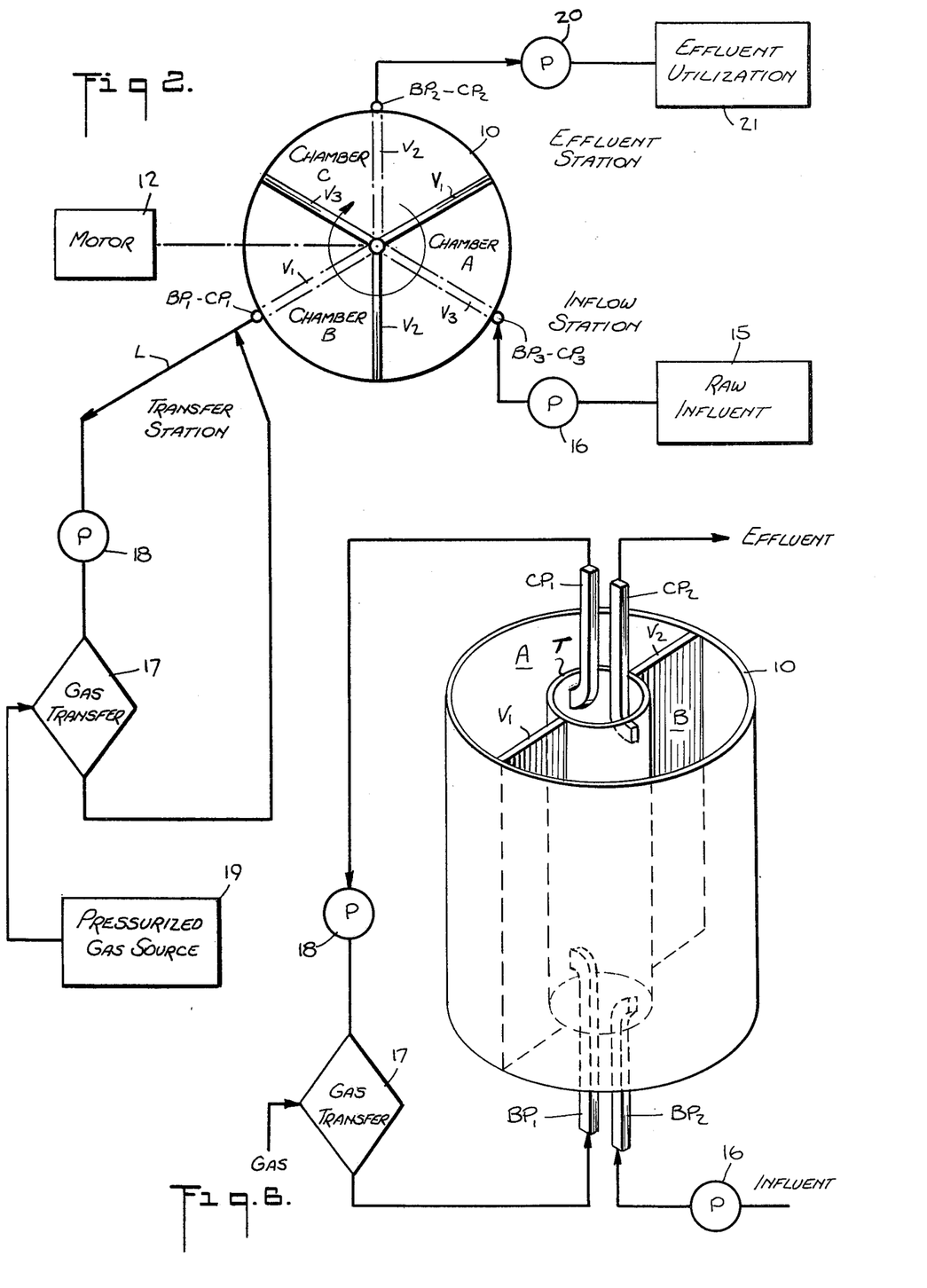
FIG. 2 is a schematic diagram of the system shown in FIG. 1.
FIG. 3 is an exploded view of a two-chamber drum included in a second preferred embodiment of a system in accordance with the invention.
Figure 3:
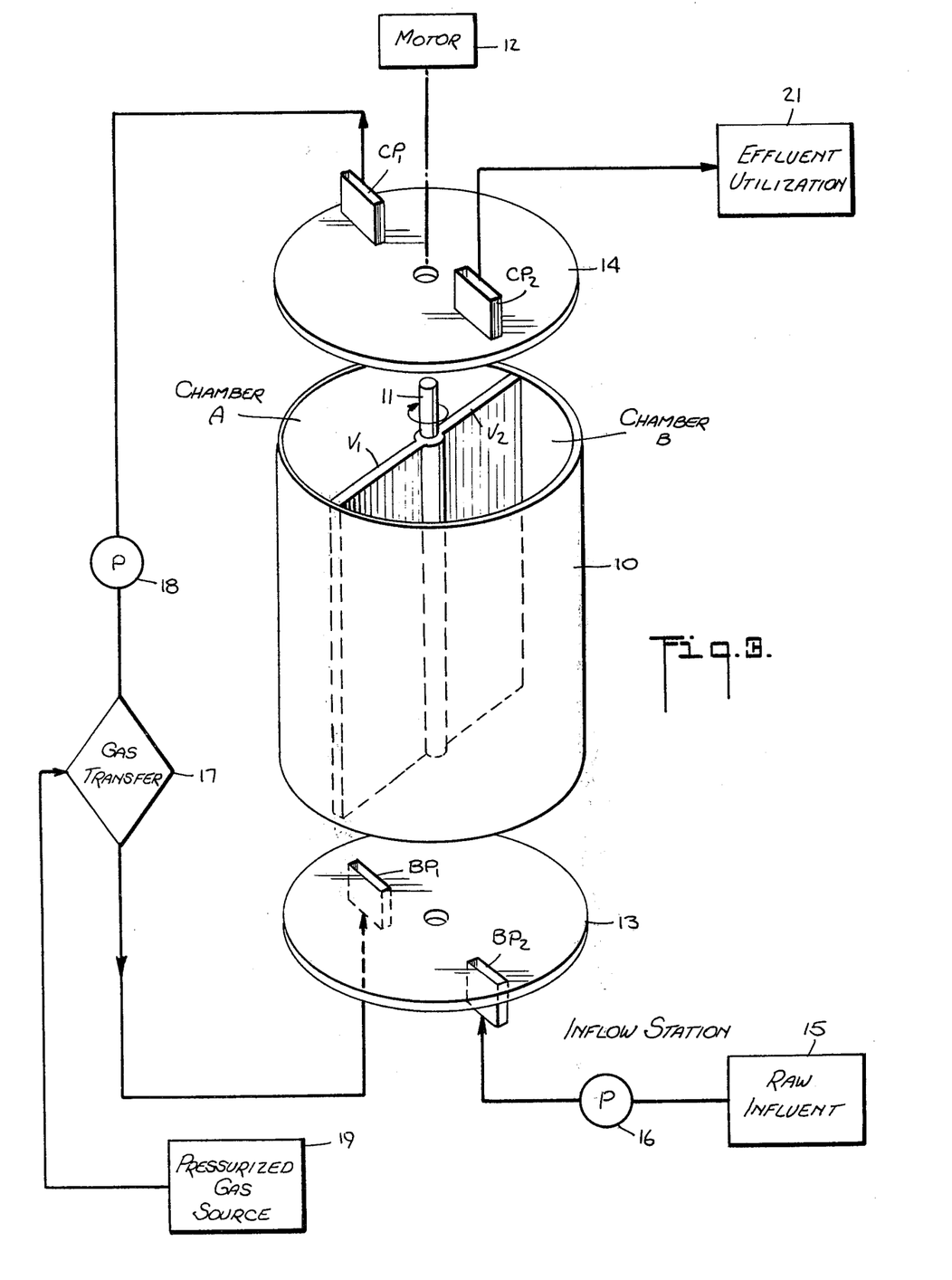

Referring now to FIGS. 1 and 2, there is shown a preferred embodiment of a gas transfer system in accordance with the invention for achieving a high level of pressurization with minimal energy requirements. The system includes a three-chamber structure formed by a cylindrical drum 10 which is stationary and three radial vanes $V_1$, $V_2$ and $V_3$ supported for rotation within the drum on a central shaft 11 that is slowly driven at a uniform speed by a motor 12. Drum 10 is enclosed at its lower end by a base disc 13 and at its upper end by a cover disc 14.

The vanes divide drum 10 into three liquid chambers A, B and C. These chambers are interfaced with an inflow station, a transfer station and an outflow station by a set of ports $BP_1$, $BP_2$ and $BP_3$ attached to base disc 13 and a corresponding set of ports $CP_1$, $CP_2$ and $CP_3$ attached to cover disc 14, the ports all communicating with the interior of the drum. Port pair $BP_1$–$CP_1$ constitute the interface for the transfer station, port pair $BP_2$–$CP_2$, the interface for the effluent station and a port pair $BP_3$–$CP_3$, the interface for the inflow station.

The ports all have an oblong cross-section, the long axes of the base and cover ports all lying on radial lines which correspond to the upper and lower edges of vanes $V_1$, $V_2$ and $V_3$ when at certain points in the course of rotation, these vanes register with the ports, as shown schematically by the dotted line vanes in FIG. 2. The width of the ports match the width of the vanes so that at their points of registration, the vanes act to seal off the ports and to block flow therethrough.

In the preferred embodiment shown, vanes $V_1$, $V_2$ and $V_3$ are 120° apart and the ports are likewise displaced from each other; hence in the course of a full 360° rotation of shaft 11, all ports are blocked at 0°, 120° and 240°. In practice, the ports need not be oblong but may have a circular cross-section or any other suitable shape, in which case the upper and lower edges of vanes $V_1$, $V_2$ and $V_3$ must be provided with sealing plates or other expedients adapted to cooperate with the ports to block flow when the vanes register therewith. To insure the integrity of liquid chambers A, B and C and to prevent leakage therebetween, the long edges of the vanes which slide along the inner wall of the drum may be provided with suitable seals which engage the wall surface.

Liquid chambers A, B, and C are caused to rotate with respect to the fixed station interfaces whereby each chamber is brought into operative relation sequentially with the inflow, the transfer and the outflow station. The interface ports are always in communication with the respective chambers in the course of each rotary cycle except at the three angular positions at which the points are blocked by the vanes.

While for purposes of illustration, vanes $V_1$, $V_2$ and $V_3$ are shown at rotating with respect to drum 10 which is stationary, in practice, the vanes may be attached to the inner wall of drum 10, with the drum supported on bearings and being caused to rotate about its central axis, in which case liquid chambers A, B and C proceed to rotate relative to the interface ports on stationary discs 13 and 14 so that they are each brought into operative relation with the three stations.

At the inflow station, waste water or other raw fluent materal derived from an influent source 15 is fed into whatever chamber is then in operative relation therewith by means of a pump 16 or by gravity flow. The influent is fed into the chamber through base port $BP_3$ and the air displaced from the chamber by the incoming liquid is vented through cover port $CP_3$ of the inflow station interface.

In FIG. 2, the inflow station interface $BP_3$–$CP_3$ is shown in operative relation with chamber A which is the sector of drum 10 defined by vanes $V_1$ and $V_2$. This operative relation exists for a period whose duration lasts as long as the inflow station interface lies within the arc of the chamber A sector.

The flow rate of influent into chamber A is such with respect to its speed of rotation and its volume as to completely fill this chamber with a batch of raw liquid to be treated before the filled chamber is advanced in the clockwise direction to assume an operative relation with respect to the interface $BP_1$–$CP_1$ of the transfer station. At the point of transition between the inflow and transfer station, all ports are blocked by the vanes; hence no liquid is lost from chamber A. The rate of rotation N is determined by the equation:

$$N = Q/(\pi r^2 h)$$

where $Q$ = flow rate in cubic feet per minute
$r$ = drum radius in feet
$h$ = drum height in feet.

In practice, the amount of influent available for treatment may be subject to variation, in which case the speed of rotation should be set for the maximum anticipated flow rate. As a consequence, the chamber will not be fully filled when the flow rate of influent falls below the maximum level. Since the system works most effectively when the chamber containing a batch of raw liquid to be treated is full or nearly so, one may provide an automatic control system which senses the flow rate of air displaced from the chamber being filled with raw liquid to control drive motor 12 so as to slow it down to prolong the operative period at the inflow station to permit the chamber to be adequately filled.

When rotation chamber A containing a batch of raw liquid to be treated is brought into operative relation with the interface $BP_1$–$CP_1$ of the transfer station, the liquid is then circulated in a closed external loop L through this station, during which phase it is subject to pressure and saturated with gas. Since the chamber is filled with liquid and there is no displacement, practically no energy is expended in pressurizing the liquid chamber.

The rate of rotation is such that before the end of the operative interval at the transfer station, the liquid being treated has circulated at least once through a gas transfer device 17, circulation through this device being effected by a pump 18 in the closed external loop L between base port $BP_1$ and cover port $CP_1$ of the transfer station interface.

Gas transfer device 17 is a pressure-sealed device of any type known in the art, such as a counter-current flow tower, a co-current packed tower or the gas transfer device disclosed in the above-identified Speece patent. Pump 18 may be used by itself as a transfer device with oxygen supplied thereto. The gas is derived from a pressurized-gas source 19 whose pressure is sufficiently high to subject the liquid being treated to pressure promoting absorption of the gas therein. The pressure in the loop may be augmented by a pressurizing pump.

In practice, an additional pump (not shown) may be used in connection with gas transfer device 17 to supply supplemental liquid thereto in the event there is a leakage of liquid, which leakage in the absence of supplementary liquid would introduce air into the loop and thereby increase the energy requirements for pressurization.

In the arrangement illustrated in FIGS. 1 and 2, gas transfer takes place in an external loop through which the liquid to be treated is recirculated. However, it is also feasible at the transfer station interface to introduce pressurized gas from source 19 directly into the chamber then in operative relation with this station. In this alternative arrangement, the liquid being treated is rendered turbulent by the incoming gas to induce dissolution of the gas in the liquid without the need for an external recirculation loop.

While in FIG. 1 the interface for the gas transfer station takes the form of a port $BP_1$ at the base of the drum and a port $CP_1$ at the top of the drum, in practice both ports may be created at the base disc by a split duct providing a separate liquid and output for the loop.

When the rotating chamber A containing a batch of treated liquid is thereafter brought into operative relation with the interface $BP_2$–$CP_2$ of the outflow station, the liquid is then discharged through port $BP_2$ from this chamber by gravity or by pump 20 into an effluent utilization device 21. As the liquid is discharged, the chamber is filled with air drawn through cover port $CP_2$ vented to the atmosphere. The rate of liquid discharge is such that chamber A is entirely emptied before it is advanced to the inflow station to initiate the next cycle of operation.

In the three-chamber structure illustrated in FIGS. 1 and 2, when chamber A is in operative relation with the inflow station, chamber B is then in operative relation with the transfer station and chamber C is in operative relation with the outflow station. When, however, the vanes register at the cut-off points with the station interfaces, the vanes then function to seal off the interfaces, and when the vanes pass the cut-off points, each advancing chamber is then brought into operative relation with the next station in the series thereof. Thus each time the interfaces are unblocked, each station is brought into operative relation with a respective chamber, there being no interaction among the chambers.

Thus except for the momentary intervals in which the station interfaces are blocked, all three chambers are operative to carry out inflow, gas transfer and outflow functions. Though the system in accordance with the invention is based on a batch process, it is effectively continuous; for no sooner is the formation of one batch of raw liquid completed at the inflow station is a given chamber and advanced toward the gas transfer station, then the formation of a second batch in another chamber is initiated, the completion of the second batch occurring upon the conclusion of treatment of the one batch and the conclusion of discharge of the previously treated batch at the outflow station.

Second Embodiment

The arrangement shown in FIG. 3 represents a simplification of the gas transfer system illustrated in FIGS. 1 and 2; for instead of three liquid chambers, drum 10 is divided by radical vanes $V_1$ and $V_2$ which are supported by shaft 11 in a diametrical plane into only two chambers A and B. As in the case of FIG. 1, the interface for the gas transfer station which includes gas transfer device 17 is constituted by base port $BP_1$ and cover port $CP_1$.

However, instead of port-pair interfaces for the inflow and outflow stations, base port $BP_2$ serves as the interface for the inflow station, and the correspondingly positioned cover port $CP_2$ serves as the interface for the outflow station.

We shall assume that chamber B has just been brought into operative relation with the inflow and outflow interfaces $BP_2$, $CP_2$ and that it is filled with a batch of liquid that had been treated with gas at the gas transfer station. Raw liquid from influent source 15 is forced by pump 16 (or by gravity) into inflow interface port $BP_2$, and the incoming raw liquid acts to displace the treated liquid contained in chamber B and to discharge this liquid from interface port $CP_2$ into effluent utilization device 21. The parameters are such that this operative period of the system permits substantially full discharge of the treated liquid and the production of the full batch of raw liquid in chamber B to replace the discharged liquid.

However, these parameters are not critical; and since the supply of raw influence may be subject to variation, should the amount of raw influent fed into chamber B during its operative period with respect to the inflow and outflow interfaces $BP_2$ and $CP_2$ be insufficient to fully displace the treated liquid from this chamber, then the chamber will still contain a full batch before it is advanced into operative relation with the gas transfer system.

But in this instance, the resultant liquid batch will not be entirely composed of raw liquid, for a portion thereof will be undischarged treated liquid. While the presence of the undischarged treated liquid acts to dilute the raw liquid in the batch, it does not interfere with the ability of the gas transfer station to treat this batch.

Third Embodiment

In the three-chamber drum arrangement shown in FIG. 1, the interface for the inflow station cooperates with a pump to supply raw influent to the chamber then in operative relation therewith, the inflow station interface having an inflow port $BP_3$ and an air vent port $CP_3$ through which the air displaced by the incoming liquid is discharged into the atmosphere. Similarly, the outflow station has an interface composed of an outflow port $BP_2$ through which treated liquid batch is discharged and an air vent port $CP_2$ through which atmospheric air is drawn into the chamber to replace the liquid.

Figure 4:
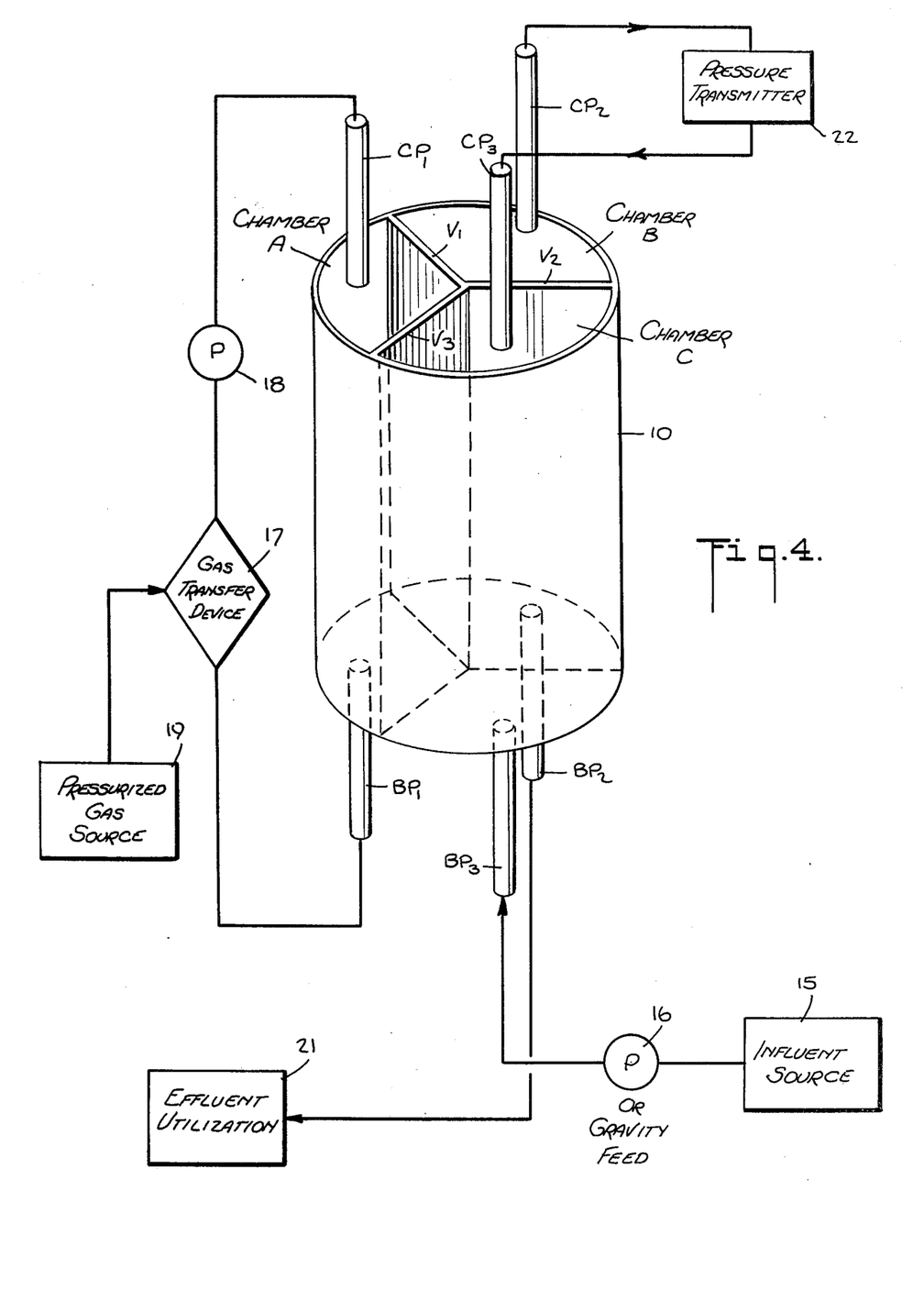
FIG. 4 schematically shows a third preferred embodiment of the invention which makes use of a three-chamber drum.

The embodiment disclosed in FIG. 4 makes use of the same three-chamber drum structure as in FIG. 1 with station interfaces formed by three port-pairs. However, instead of wasting the air displaced from the chamber as it is being filled with raw liquid through inflow port $BP_2$, the displaced air discharged from the chamber through the related vent port $CP_3$ is utilized to force the treated liquid out of the adjacent chamber.

In FIG. 4, chamber A is in operative relation to the gas transfer station, chamber B is in operative relation to the outflow station, and chamber C is in operative relation to the inflow station. Hence as chamber C is being filled with raw influent through inflow port $BP_3$, the air displaced from this chamber is conducted from vent port $CP_3$ through an air-pressure transmitter or pressurized chamber 22 into air vent port $CP_2$, which is then in operative relation to chamber B, which is filled with a batch of treated liquid, the pressurized air serving to force this liquid out of chamber B into the effluent utilization device 21. Thus pump 16, which produces the pressure necessary to force raw liquid into chamber C, also subjects the air displaced from the chamber to pressure to provide the force necessary to displace the liquid from chamber B.

Fourth Embodiment

Figure 5:
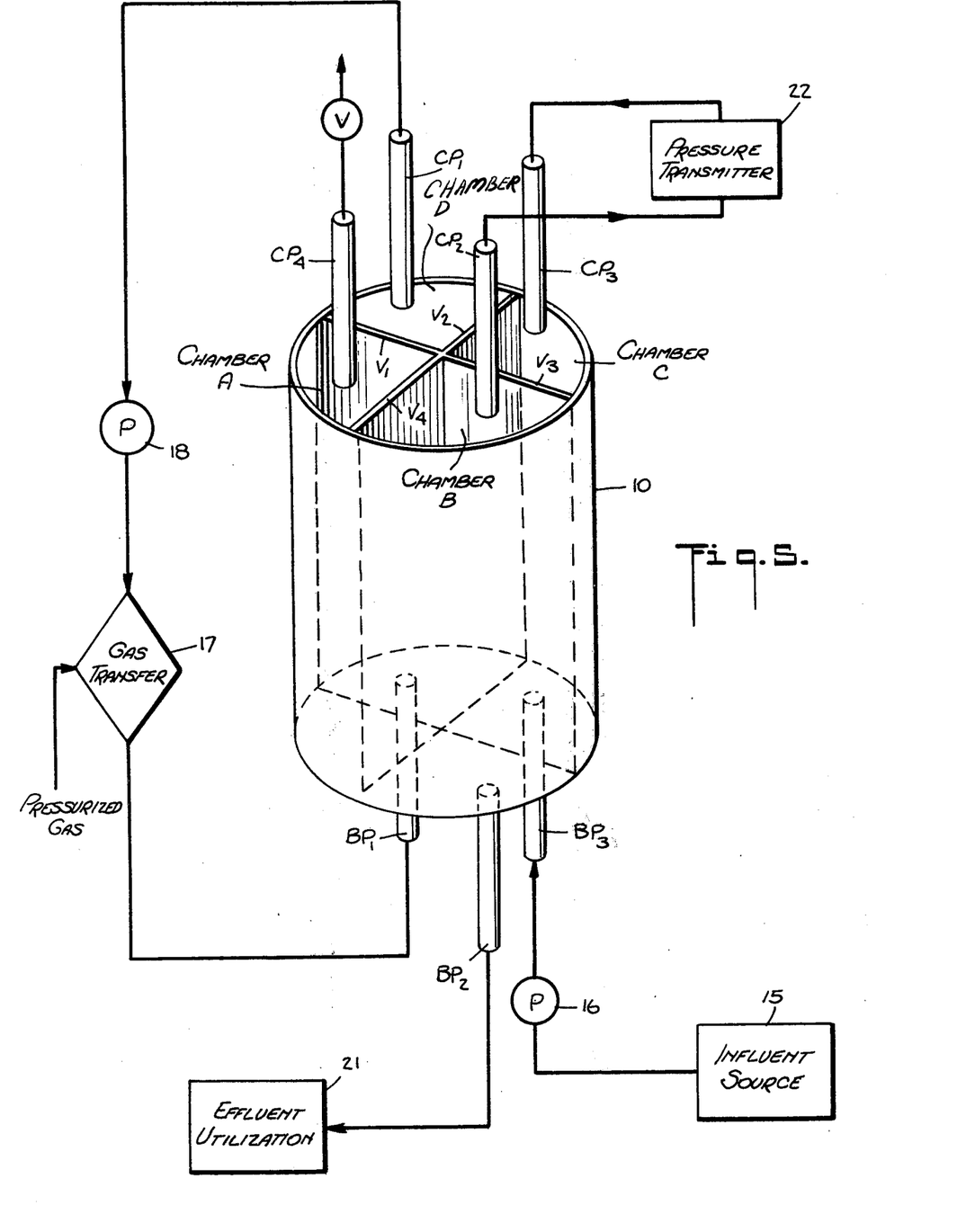
FIG. 5 schematically shows a fourth embodiment of the invention which includes a four-chamber drum.

In this embodiment, as shown in FIG. 5, drum 10 is divided by four vanes $V_1$, $V_2$, $V_3$ and $V_4$ into four chambers A, B, C and D which cooperate with an inflow station interface formed by port pairs $BP_3$–$CP_3$, an outflow station interface formed by port pairs $BP_2$–$CP_2$, a gas transfer interface formed by port pair $BP_1$–$CP_1$ and a pressure-reducing station interface formed by cover port $CP_4$ which couples the chamber in operative relation therewith to a pressure-reducer V.

Pressure-reducer V acts to somewhat relieve the pressure within the chamber containing a batch of treated liquid before this batch is advanced to the outflow station to discharge from the drum. The operation of this structure with regard to the inflow, gas transfer and outflow stations is essentially the same as that described in connection with FIG. 4, wherein the air vented from the chamber containing the raw liquid is used to provide pressure to force treated liquid from the adjacent chamber.

The pressure-reduction station in this embodiment of the invention is interposed in the batch process between the gas transfer station at which the raw liquid is treated with pressurized gas and the outflow station in which the treated liquid under pressure is discharged. The pressure-reducing station functions to somewhat reduce the pressure of the treated liquid to avoid depressurization thereof in an abrupt step which would otherwise occur when the treated liquid is released to atmospheric pressure at the outflow station. This abrupt drop in pressure may be undesirable, if it results in excessive effervescence. In practice, more than one pressure-relieving station may be provided to effect a gradual reduction in pressure.

Fifth Embodiment

In the fifth embodiment of the invention disclosed in FIG. 6, the drum arrangement is such as to provide two chambers A and B as in the case of the embodiment shown in FIG. 3. These chambers cooperate with a gas transfer station interface composed of port pair $BP_1$–$CP_1$, an inflow station interface formed by port $BP_2$ and an outflow station interface formed by port $CP_2$.

However, in contradistinction to the second embodiment shown in FIG. 3, in the fifth embodiment, vanes $V_1$ and $V_2$ having their outer edges attached to the inner wall of drum 10 which is rotatable, the inner edges of these vanes slidably engaging the outer surface of a stationary central column T. The ports, instead of communicating with the chambers through base and cover discs as in the previous embodiments, are extended into column T and communicate with the chambers through openings in this column. The advantage of this arrangement is that it minimizes sealing problems, for the main surface to be sealed has the relatively small area of column T as opposed to the large inner surface area of drum 10 which, in this instance, requires no sealing, in that vanes $V_1$ and $V_2$, are secured thereto.

While there has been shown and described preferred embodiments of a gas transfer system in accordance with the invention, it will be appreciated that many changes and modifications may be made therein without, however, departing from the essential spirit thereof.

I claim:

1. A gas transfer system adapted to dissolve a gas or other compressible fluid in a relatively incompressible liquid or other fluent material to be treated, said system comprising:
   A. a cylindrical drum provided with station interface ports and divided by radical vanes into distinct chambers;
   B. means to rotate said chambers with respect to said station interface ports, said ports being in communication with said chambers in the course of each cycle of rotation except when the vanes register with and block the ports;
   C. an inflow station coupled to one of said interface ports to feed raw liquid to be treated into the chamber when in operative relation therewith to produce a liquid batch therein before this chamber is advanced into operative relation with a second interface port;
   D. a gas transfer station coupled to said second port to subject the liquid batch in the chamber in operative relation therewith to pressurized gas to effect the absorption of the gas by the liquid batch to produce a treated liquid batch before the chamber is advanced into operative relation with a third of said interface ports; and
   E. an outflow station coupled to said third port to discharge the treated batch therefrom and thereby empty the chamber so that it can be refilled with raw liquid and the operating cycle repeated.

2. A system as set forth in claim 1, wherein said drum is stationary and said radial vanes are supported on a central shaft which is rotated relative to said drum.

3. A system as set forth in claim 1, wherein said radial vanes are secured to said drum, and wherein said drum is rotated about its central axis to cause said chambers to rotate.

4. A system as set forth in claim 1, wherein vanes are provided to define three chambers, the chambers being in operative relation with the inflow, transfer and outflow stations.

5. A system as set forth in claim 1, wherein vanes are provided to define two chambers and the inflow and outflow station interface ports are in operative relation with a common chamber, while the other chamber is in operative relation with the gas transfer station interface port.

6. A system as set forth in claim 1, wherein the drum is provided with end enclosures and the interface ports for the stations are attached to the end enclosures, the shape of the ports being such that when the edges of the rotating vanes are in registration therewith, the ports are blocked.

7. A system as set forth in claim 1, wherein said transfer station is constituted by a closed loop external to said drum which incorporates therein a gas transfer device and means to recirculate the liquid batch in the chamber in operative relation therewith through the loop.

8. A system as set forth in claim 7, wherein said gas transfer device is supplied with pressurized oxygen.

9. A system as set forth in claim 1, wherein said drum is divided by said vanes into three chambers, and said drum is enclosed by top and bottom plates each provided with a like set of three interface ports in communication with the respective chambers, the interface ports on the plates having an oblong cross-section and lying on radical lines such that when the upper and lower edges of the three radical vanes are in registration with the top and bottom ports, all ports are blocked, the related pair of top and bottom interface ports associated with one chamber being coupled to an external recirculating loop forming the gas transfer station, the related pair of top and bottom interface ports associated with another chamber being coupled to the inflow station, one serving as an inflow port and the other as an air vent, the related pair of top and bottom interface ports associated with the final chamber being coupled to the outflow station, one serving as an outflow port and the other as an air vent.

10. A system as set forth in claim 9, wherein the air vent port of the inflow station interface is coupled to the air vent port of the outflow station interface whereby the air which is displaced from the chamber in operative relation with the inflow station when feeding raw liquid therein serves to provide air pressure to expel liquid from the chamber containing a batch of treated liquid.

11. A system as set forth in claim 1, wherein said drum is divided by at least four vanes into four chambers, interface ports being provided for three chambers, three interface ports associated with three of said chambers being coupled to said inflow, gas transfer and outflow stations, the other interface ports associated with the remaining chamber being coupled to pressure reduction stations to reduce gradually the pressure of the treated batch before the chamber containing this batch is advanced into operative relation with the outflow station.

12. A system as set forth in claim 1, wherein said drum is divided by diametrically-diposed vanes into two like semi-cylindrical chambers and said drum is enclosed by top and bottom plates each having a set of two interface ports on a diametrical line whereby these ports are blocked when the vanes are in registration therewith, the transfer station being formed by a closed external loop coupled to one pair of related top and bottom parts, the inflow station being coupled to the bottom port of the other pair whose top port is coupled to the outflow station, whereby when a chamber containing a treated batch is brought in operative relation to the ports of the other pair, the raw liquid fed into said chamber through the bottom port thereof serves to displace the treated liquid from the chamber through the top port.

13. A system as set forth in claim 12, further including a pump to feed raw liquid into said bottom port.

14. A system as set forth in claim 12, wherein said loop includes a counter-current flow tower to effect gas transfer from a pressurized gas source into the liquid circulated through the loop.

15. A system as set forth in claim 1, further including pump means associated with said gas transfer station to supply supplemental liquid thereto in the event there is a leakage of liquid which, in the absence of said supplemental liquid, would introduce air into said station.

16. A system as set forth in claim 1, further including a stationary hollow column disposed within said drum coaxially with respect to the central axis thereof, the outer edges of the radial vanes being secured to the inner surface of the drum which is rotatable relative to the column to rotate said chambers, the inner edges of the vanes being in sliding contact with the outer surface of the column.

17. A system as set forth in claim 1, wherein said interface ports are extended into the column and communicate with said chambers through openings in said column.

* * * * *

UNITED STATES PATENT OFFICE
CERTIFICATE OF CORRECTION

PATENT NO. : 4,124,508　　　　　　　　　　　　　　　　Page 1 of 2

DATED : November 7, 1978

INVENTOR(S) : Constantine Capetanopoulos

It is certified that error appears in the above-identified patent and that said Letters Patent are hereby corrected as shown below:

Column 2, line 47 "when" should have read -- then --

Column 2, line 62 "pressure" should have read -- process --

Column 4, line 11 "points" should have read -- ports --

Column 4, line 13 "at" should have read -- as --

Column 4, line 22 "materal" should have read -- material --

Column 6, line 9 "is" should have read -- in --

Column 6, line 47 "influence" should have read -- influent --

Column 7, line 13 "$BP_2$" should have read -- $BP_3$ --

Column 8, line 38 "radical" should have read -- radial --

Claim 9, line 7 "radical" should have read -- radial --

Claim 9, line 8 "radical" should have read -- radial --

UNITED STATES PATENT OFFICE
CERTIFICATE OF CORRECTION

PATENT NO. : 4,124,508

DATED : November 7, 1978

INVENTOR(S) : Constantine Capetanopoulos

It is certified that error appears in the above-identified patent and that said Letters Patent are hereby corrected as shown below:

Claim 12, line 2 "diposed" should have read -- disposed --

Claim 12, line 9 "parts" should have read -- ports --

Signed and Sealed this

Twentieth Day of February 1979

[SEAL]

Attest:

RUTH C. MASON
Attesting Officer

DONALD W. BANNER
Commissioner of Patents and Trademarks